July 3, 1934.  H. H. MOSS  1,964,926
APPARATUS FOR CONSTRUCTING TUBULAR JOINTS
Filed July 25, 1930  3 Sheets-Sheet 2
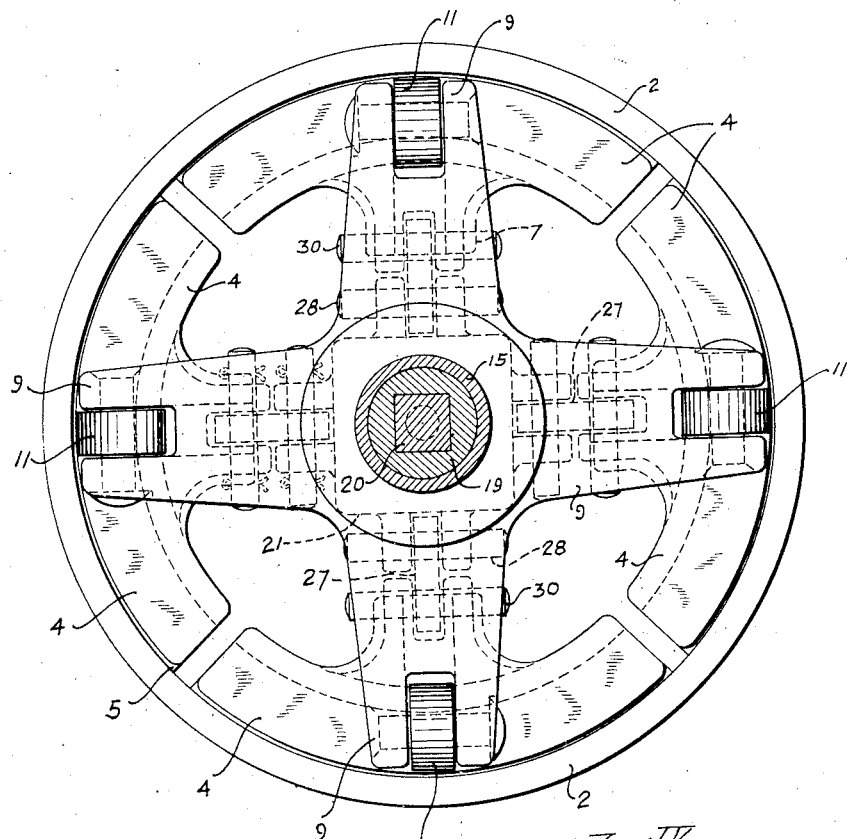
Fig. II
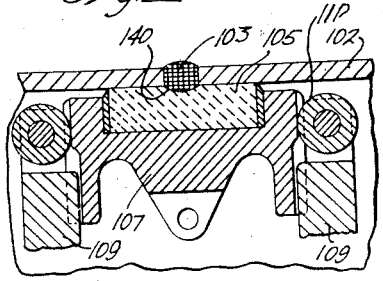
Fig. III
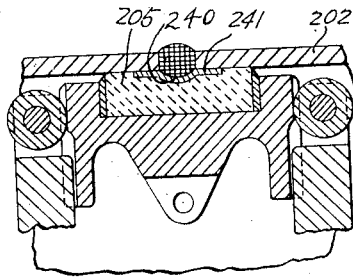
Fig. IV July 3, 1934.  H. H. MOSS  1,964,926
APPARATUS FOR CONSTRUCTING TUBULAR JOINTS
Filed July 25, 1930     3 Sheets-Sheet 3
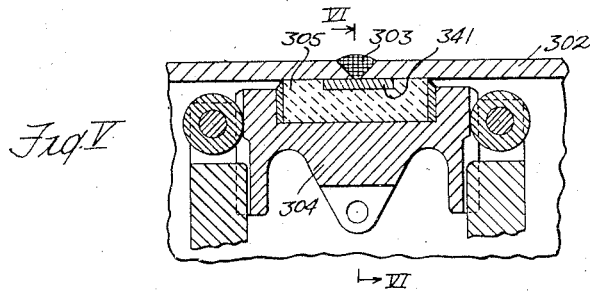
Fig. V
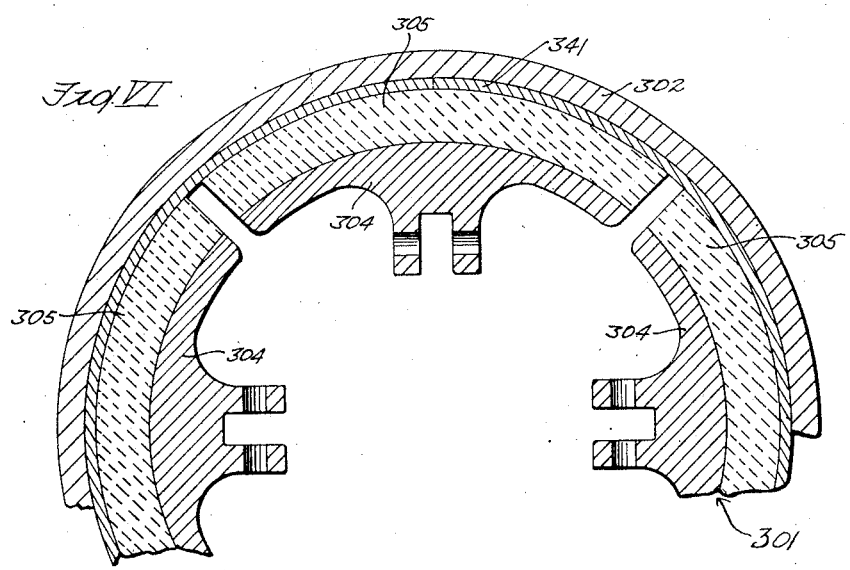
Fig. VI
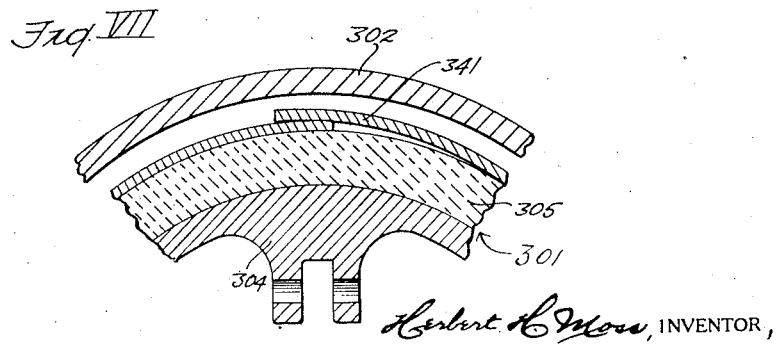
Fig. VII
Herbert H. Moss, INVENTOR,
BY
Byrnes Townsend & Potter, ATTORNEYS.

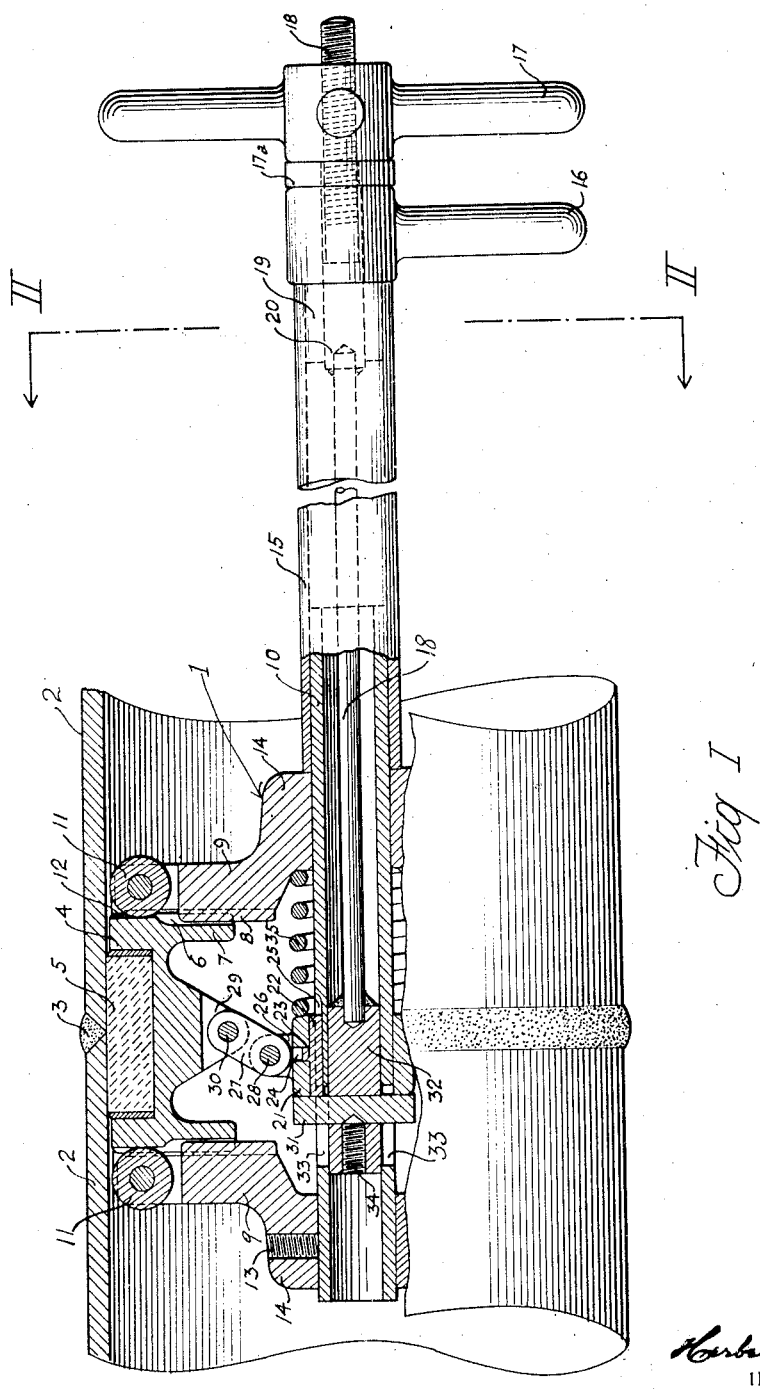

Patented July 3, 1934

1,964,926

UNITED STATES PATENT OFFICE 1,964,926

APPARATUS FOR CONSTRUCTING TUBULAR JOINTS

Herbert H. Moss, Brooklyn, N. Y., assignor to The Linde Air Products Company, a corporation of Ohio Application July 25, 1930, Serial No. 470,654

8 Claims. (Cl. 113—103)

My invention relates to an apparatus for aligning the ends of tubular sections to be welded together and for backing up the weld metal which is deposited in the joint seam.

In the construction of such a circumferentially welded joint the ends of the tubular sections are brought opposite to and in alignment with each other in position to be welded. The weld is usually begun on the top of the circumferential seam and as the weld progresses it is desirable to roll the welded portion downward in order to continue the deposit of the weld metal on top of the seam. While the weld metal is being deposited and the sections are being rolled, it is necessary to maintain the sections in alignment.

In order to obtain an efficient weld it is necessary to extend the weld penetration to the bottom edge or root of the joint. In doing so it is necessary to fuse the inner edges of the ends of the sections to be joined to secure a union between these edges and the deposited weld metal. Unless some precaution is taken the molten weld metal about the inner edge of the end sections will sag towards the center of the tube producing a protrusion within the sections in the form of a metal bead along the inner wall of the sections which may obstruct the flow of material conveyed through the pipe, and may also hinder the use of cleaning implements for cleaning the inner walls of the sections.

One of the objects of my invention is to provide a means for conveniently maintaining the alignment of the ends of tubular sections while they are being welded.

Another object of my invention is to provide an apparatus adapted to be inserted and internally expanded in a nonman size tube to align the ends of two tubes to be welded together and to back up the weld metal during the welding process and adapted to be removed thereafter from the tube.

Another object of my invention is to provide an apparatus which may be conveniently removed from the sections upon completion of the joint so that the flow of material conveyed by the tubular sections will not be obstructed.

Another object of my invention is to equalize the opposite diameters of the adjacent ends of the pipe to be welded in cases where the pipe walls may be radially flexed.

Another object of my invention is to provide a means for internally expanding and maintaining a backing up strip against the interior walls of the ends of tubes to be joined.

These and other objects will be more clearly understood from the following description and accompanying drawings in which:

Figure I is a partial sectional and elevational side view of the apparatus in its adjusted position within a pipe joint.

Figure II is an end view on line II—II of Figure I looking in the direction of the arrows.

Figure III is a fragmentary longitudinal sectional view of a pipe joint and a modified form of backing up material.

Figures IV and V are fragmentary longitudinal sectional views of different forms of pipe joints and modified forms of the apparatus for use with metal backing up strips which are employed in the joint construction.

Figure VI is a partial cross section of the pipe joint and apparatus on line VI—VI of Figure V in which the apparatus and backing up strip is shown in its expanded position.

Figure VII is a partial cross section of the apparatus and backing up strip in the non-expanded position but inserted within the end of one of the pipes.

Referring particularly to Figs. I and II of the drawings, the head 1 of my apparatus is shown inserted in the ends of two pipe sections 2. The apparatus is shown in its adjusted position ready to receive the weld metal 3 between the edges of the two pipe sections 2. The head 1 of the apparatus is provided with a plurality of radial segments 4 which are adapted to be moved radially outward from the axis of the head 1 to clamp the ends of the pipe sections in proper alignment to be welded. An insert 5 of highly infusible material is embedded in the outer periphery of each of the segments 4. These inserts 5 are adapted to cover the seam between the pipe sections 2 and to back up the fused weld metal 3 in the seam. A groove 6 is formed in an arm 7 on each side of each of the segments 4 which receives a land 8 on opposed sets of guides 9 which are secured to a hollow axial rod 10 which passes through the head 1. Each of the outer ends of the segment arms 7 is guided by a pair of opposed rollers 11 mounted in the bifurcated ends of the radial guides 9. The rollers are received in a groove 12 in the segment arms 7. One set of the radial guides 9 is shown herein as permanently fixed to the hollow axial rod 10 extending therethrough. These guides may be removably secured to the hollow rod 10 in a manner similar to the other set of guides 9 which is secured to the hollow rod 10 by means of a setscrew 13 which passes through a hub 14 from which the guides project.

A hollow extension rod 15 is secured at one end to one end of the hollow axial rod 10 which passes through the head 1. The hollow extension rod 15 is adapted to extend through the length of one of the pipe sections 2, so that it can be manually operated by a handle 16 secured thereto for the purpose of inserting and removing the apparatus from the pipe and to prevent the head of the apparatus from revolving when a hand-wheel 17 cooperating with this end of the extension rod 15 is operated to move the radial segments 4 inwardly and outwardly. The handwheel 17 is internally threaded and these threads cooperate with the threads on the end of an actuating rod 18 which projects out of the extension rod 15. A thrust bearing washer 17a is inserted between the handwheel 17 and the end of the extension rod 15 to receive the thrust of the handwheel 17. The opposite end of the actuating rod 18 extends through the extension rod 15 and into the hollow rod 10 in the head 1 and it is operatively connected to the radially movable segments 4. A bushing 19 having an internal bore of polygonal or non-circular section is secured in the end of the extension rod 15. The actuating rod 18 passes through this bushing and is provided with an enlargement 20 having a section corresponding to the bushing bore. The enlargement slides in the bushing and prevents the actuating rod from rotating when the handwheel 17 is operated.

The end of the actuating rod 18 which terminates the head 1 is adapted to actuate a slidable collar 21 which is slidably keyed to the hollow rod 10 by means of a key 22 secured to the collar 21 by a projection 23 on the key 22 which extends into a recess 24 in the collar. The key 22 slides in a groove 25 cut in the rod 10. The collar is provided with ears 26 between which one end of each of the toggle links 27 fits. One end of each link is pivotally connected to the ears 26 by a pin 28 which passes through the ears and the toggle links. The other end of each of the toggle links 27 is pivotally connected to ears 29 on the radial segments 4 by a pin 30 which passes through these ears and that end of the toggle links. The slidable collar 21 is actuated in one direction by a pin 31 which passes through an enlarged head 32 on the actuating rod 18 which slides in the bore of the hollow axial rod 10. The pin 31 extends outwardly from the rod head 32 through longitudinally opposed slots 33 in the hollow axial rod 10. This pin 31 is secured in the head 32 by a setscrew 34 which is threaded into a longitudinal bore in the end of the actuating rod 18. The slidable collar 21 is actuated in the other direction by a spring 35 which is compressed between the collar 21 and the hub 14 fixed to the hollow rod 10 in the head 1 of the apparatus.

In the operation of the apparatus, the pipe sections 2 are fixed in position to be welded and the head 1 of the apparatus is inserted in the pipe so that the infusible inserts 5 cover the joint to be formed between the pipe sections 2. The handle 16, which is secured to the extension rod 15, is grasped with one hand and the handwheel 17 on the actuating rod 18 is grasped with the other and revolved so that the actuating rod 18 is moved outwardly from the outer end of the extension rod 15 and the radial segments 4 are thereby moved outwardly against the interior walls of the pipe sections 2. The infusible inserts 5 on the radial segments 4 clamp the pipe sections into position ready for welding and where the walls of the pipe are flexible and have been deformed, the inserts 5 may be moved with sufficient force to equalize the diameters of the pipe ends or square up the ends so that the walls of the adjacent ends of the pipe are brought into good alignment.

Having properly aligned and clamped the ends of the pipe in place they may be conveniently welded together. Upon completion of the joint, the apparatus may be removed from the pipe by revolving the handwheel 17 in the opposite direction and the spring 35 which is compressed against the slidable collar 21 in the head 1 of the apparatus will actuate the collar in such a manner that the radial segments 4 will be drawn inwardly and will be released from the inner walls of the pipe 2. The apparatus then may be withdrawn from the pipe.

In referring to the parts of the modifications of the apparatus disclosed in Fig. III, the modification in Fig. IV, and the modification in Figs. V to VII the same reference numerals with the addition of 100, 200 and 300, respectively, will be used to refer to the parts which correspond to those in Figs. I and II.

The operation and construction of the apparatus disclosed in Fig. III is the same as that disclosed in Figs. I and II except the refractory backing up insert 105 is provided with a circumferential groove 140 to receive the weld metal 103. The groove 140 permits a deeper penetration of the weld metal 103 and allows a smooth annular internal protrusion of weld metal within the internal walls of the pipe 2. The internal protrusion of the metal 103 does not materially affect the passage of materials or implements through the pipe, but the increased penetration of the weld produces a stronger joint.

The modification of the apparatus shown in Fig. IV and in Figs. V to VII are adapted to insert a weld metal backing up strip 241 and 341 within the ends of the pipe to be joined and to maintain the strip opposite the joint to be formed and in close contact with the internal walls of the pipe while the joint is being welded. The backing up strip is a split ring and it is made of metal. It is welded to and forms a part of the joint, as it is left in the pipe after the apparatus is removed. Where the backing up strips are used, the refractory inserts 205 and 305 may be replaced with a more easily fused material such as metal. The inserts 205 and 305 are circumferentially grooved to receive the strips 241 and 341 and the groove is formed to conform to the shape of the strips.

In Fig. IV the backing up strip 241 is provided with a groove 240 to allow the weld metal to protrude slightly within the inner walls of the pipe in order to obtain a deeper weld penetration. In this type of joint the end edges of the pipe 202 may be squared.

In Fig. V a V type weld is shown and the axial surface of the backing up strip 341 is straight.

The operation of the apparatus when used with the backing up strips 241 and 341 is similar to the operation of the device described supra, where no metal strip was used to back up the joint, and the operation of the apparatus when used with either of the strips is the same. Therefore, the operation of the apparatus in reference to the backing up strips will be described only in reference to Figs. V to VII.

Where the metal strip 341 is used it is placed over the head 301 so that it will lie in the groove provided in the insert 305. In the retracted position of the segments 304 shown in Fig. VII, the ends of the split ring backing up strip 341 will overlap one another. The head 301 may then be placed within the ends of the pipe opposite the joint to be formed. The segments 304 are moved radially outward so that the split ring backing up strip is expanded in close contact with the internal walls of the pipe as is best shown in Fig. VI. The seam may then be welded as in the case where no metal backing up strip is used. The strip in this case is welded to the edges of the pipe and forms a part of the joint and it remains in the pipe when the apparatus is withdrawn as has been described.

This type of joint possesses the advantages of speed and economy of welding that is possessed by the joint having no metal backing up strip, and may be used to back up the weld metal and reinforce the joint where the internal projection of the backing up strip will not produce too great an obstruction in the pipe.

The weld may be made with either the gas flame or the electric arc when the apparatus is used either with or without the metal backing up strip and the speed with which the weld is made and the quality of the weld in either case is greatly improved by the use of the apparatus. The apparatus is particularly suitable for gas welding as it enables the operator to carry a larger flame, a larger puddle of weld metal, and to deposit the weld metal with a greater regularity without any fear of producing objectionable protrusions on the inside of the joint, all of which sum up to increase the rate of welding. As a further aid in increasing the speed of welding and also decreasing the cost, the backing up material conserves and more efficiently utilizes the heat applied to the joint.

While I have shown the preferred embodiments of my invention, it is to be understood that changes in the details of the apparatus shown and described may be made without departing from the scope of my invention as defined in the appended claims.

I claim:

1. An apparatus for aligning the ends of tubular sections to be joined and for backing up weld metal used in the construction of the joint, said apparatus comprising a rod, a head on one end of said rod, said head having radially movable segments having a peripheral lining of refractory material with an exposed circumferential groove therein adapted to cover the joint seam, and means on the other end of the rod for actuating said segments.

2. An apparatus for aligning the ends of tubular sections to be joined and for backing up weld metal used in the construction of the joint, said apparatus comprising a head, a rod extending axially from said head, radial guides on said head and fixed to said rod, radial segments slidable between said guides in a plane perpendicular to said rod, a toggle link connected to each of said segments, a second rod operatively connected to said toggle links and movable axially to actuate said links and said segments in one direction and a spring adapted to actuate said links and said segments in the opposite direction.

3. An apparatus for aligning the ends of tubular sections to be joined and for backing up weld metal used in the construction of the joint, said apparatus comprising a hollow rod, a head on said rod having radial guides fixed to one end of said rod, segments slidable between said guides in a plane perpendicular to said rod, toggle links connected to said segments, a second rod having an end extending into said hollow rod and operatively connected to said links, threads on the other end of said rod extending beyond the end of said hollow rod, and a nut cooperating with said threads and with the end of said hollow rod to actuate said segments.

4. An apparatus for aligning the ends of tubular sections to be joined and for backing up weld metal used in the construction of the joint, said apparatus comprising a hollow rod, a head on said rod having radial guides fixed to one end of said rod, segments slidable between said guides in a plane perpendicular to said rod and adapted to cover the joint seam, toggle links connected to said segments at one end of said links, a second rod having one end extending into said hollow rod and operatively connected to the other end of said toggle links, threads on the other end of said second rod extending beyond the end of said hollow rod, a nut cooperating with said threads and abutting against the end of said hollow rod adjacent thereto for actuating said second rod in one direction, and a spring interposed between abutments on said rods to actuate said second rod in the opposite direction.

5. An apparatus for aligning the ends of tubular sections to be joined and for backing up weld metal used in the construction of the joint, said apparatus comprising a plurality of radially movable sectors adapted to form a circular outline, a radial guide member on each side of said sectors, a central hollow tubular member extending perpendicularly through said guides and secured thereto, a rod extending into said hollow member, a toggle link for each of said sectors, one end of each of said toggle links being pivotally connected to a corresponding sector and the other end of each of said links being connected to a member axially actuated by said rod, a handle on the outer end of said hollow member, said rod having a threaded end, and a nut cooperating with said threads and supported by the outer end of said hollow member to axially actuate said rod.

6. An apparatus for aligning the ends of tubular sections to be joined and for backing up weld metal used in the construction of the joint, said apparatus comprising a hollow axial member, a pair of radial guide members secured in spaced relation to each other on one end of said hollow member, a plurality of radially movable sectors slidable between said guide members, a toggle link for operating each of said sectors, a collar slidably keyed to said hollow member, said links having one end connected to said collar and the other end connected to one of said sectors, a spring for actuating said collar longitudinally of said hollow member, a rod extending into said hollow member, a projection on said rod extending through a slot in said hollow member for actuating said collar in opposition to said spring.

7. In apparatus of the class described, the combination of a tubular member adapted to be inserted within a pipe from an open end thereof; a plurality of radially movable elements; means secured to said tubular member and associated with said elements for maintaining the latter positioned adjacent the inner end of said tubular member; and means for clamping said elements against the inner wall of the pipe comprising a rod disposed within said tubular member; means including toggle links operatively connecting said elements and said rod at the inner end thereof; means disposed at the outer end of said rod for moving the same axially in one direction to force said elements radially outward; and means cooperating with said rod tending to oppose the axial movement of said rod.

8. In apparatus of the class described, the combination of a tubular member adapted to be inserted within a pipe from an open end thereof; a plurality of radially movable elements having their peripheral surfaces lined with a refractory material; means secured to said tubular member at the inner end thereof for guiding said elements; and means for clamping said elements against the inner wall of the pipe comprising a rod disposed and journaled in said tubular member; means including toggle links operatively connecting said elements and said rod at the inner end thereof; means disposed at the outer end of said rod for moving the same axially in one direction to force said elements radially outward; and means including a helical coil disposed about said rod tending to oppose the axial movement of said rod.

HERBERT H. MOSS.